INVENTORS.
James M. Harrison and
Allen E. Somers.
ATTORNEY

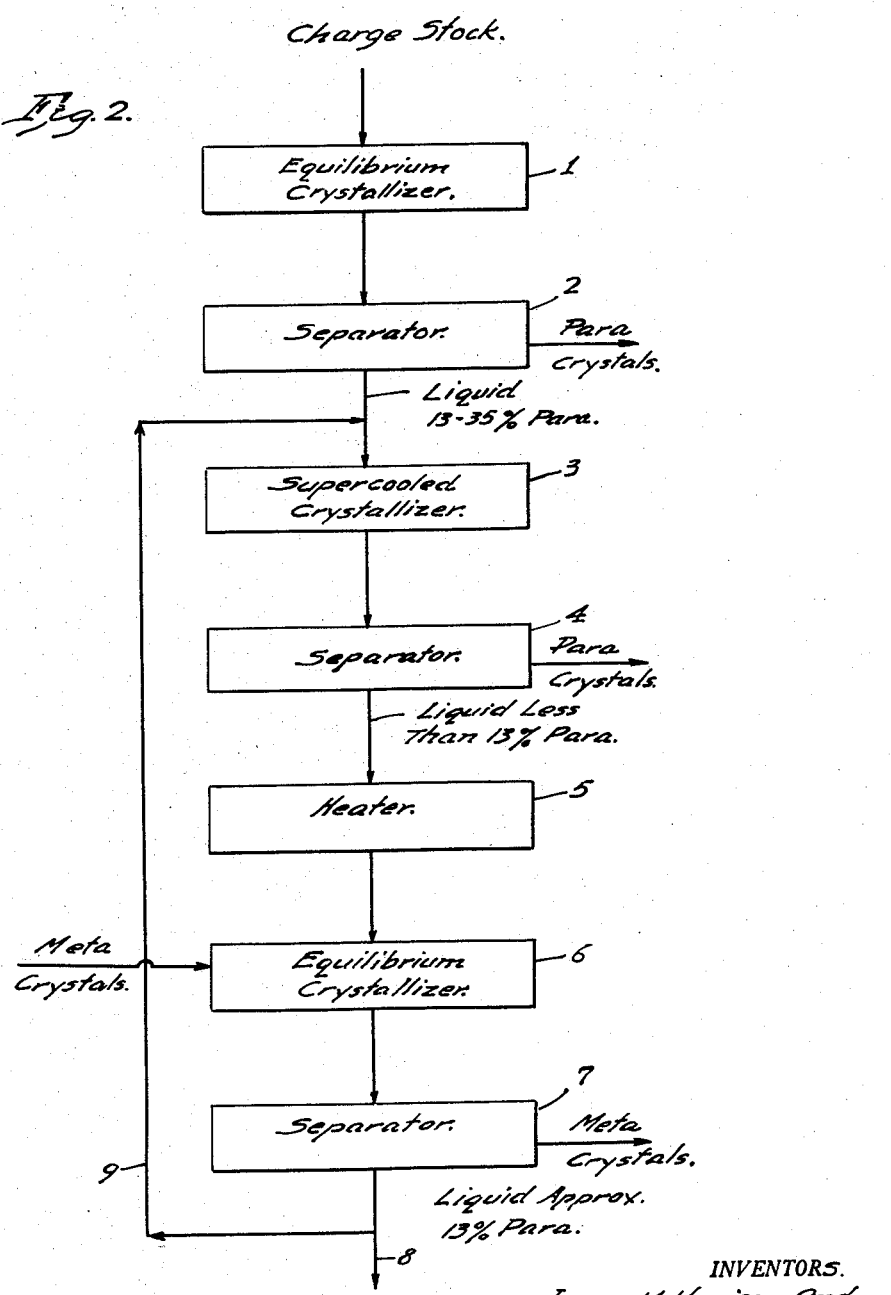

United States Patent Office 2,884,470
Patented Apr. 28, 1959

2,884,470

SEPARATION OF BINARY MIXTURES OF ISOMERS OF ORGANIC COMPOUNDS

James M. Harrison, North East, and Allen E. Somers, Aspinwall, Pa., assignors to Gulf Research & Development Company, Pittsburgh, Pa., a corporation of Delaware Application January 29, 1954, Serial No. 407,117

8 Claims. (Cl. 260—674)

This invention relates to the separation of isomers of organic compounds and more particularly to the separation of mixtures of isomers by selective crystallization.

In many cases the isomers of organic compounds have boiling points so close together that it is not feasible to separate the isomers by distillation. For example, ortho-, meta- and para-xylene have boiling points of 144.5° C., 139.3° C. and 138.5° C., respectively. The ortho-xylene may be separated from the other xylenes by precision fractionation procedures; however, the boiling points of the meta- and para-isomers are so close that satisfactory separation of those isomers by distillation processes is not practical.

Earlier attempts to separate meta- and para-xylene have employed chemical methods in which the isomers are reacted with suitable reagents to form compounds which may be separated readily. The compounds, after separation, are then separately converted back to the respective xylenes. In most instances such chemical methods of separation are expensive because of the number of procedural steps required, the consumption of reagents, and the formation of by-products which may be of little value.

Fractional crystallization of isomers has been suggested, but the separation possible in the conventional crystallization process is often limited by the composition of any eutectic of the isomers that may be formed. Again referring to a mixture of meta- and para-xylene as an example, a eutectic of those isomers having a composition of approximately 87 percent meta-xylene and 13 percent para-xylene is formed. Inasmuch as the isomers of xylene most frequently are obtained in substantially equilibrium ratios in which the meta-xylene is present in higher concentrations than the other isomers, the amount of para-xylene recovered by a conventional crystallization process is relatively low.

Attempts have been made to increase the recovery of one isomer from a mixture of isomers by the addition of a diluent to the mixture prior to the fractional crystallization. The diluent has the effect of lowering the freezing point of one of the isomers more than the other. Then, on cooling the liquid phase to sufficiently low temperatures to cause crystallization, one of the isomers, usually the para-isomer, may be separated in sufficiently large amounts to leave a liquid having a para-isomer concentration, on a diluent-free basis, lower than the concentration in the normal eutectic mixture of meta- and para-isomers.

The isomer crystals are separated from the remaining liquid phase and the diluent stripped therefrom. A subsequent crystallization process, preferably of a substantially equilibrium type, will form crystals of the meta-isomer and leave a relatively small amount of a normal meta- para-eutectic mixture which may be recycled to the charge stock. It is apparent that the addition of a diluent complicates the separation of the isomers by adding a step of stripping the diluent from the liquid phase as well as requiring the cooling of the diluent, which generally is required in substantial quantities.

According to this invention binary mixtures of isomers of organic compounds are separated by a fractional crystallization process in which the mixture is supercooled to a temperature below the freezing point of the normal eutectic of the isomers to crystallize one isomer in substantially pure form from the liquid phase. It has been discovered that the supercooled crystallization will cause the concentration of one of the isomers in the liquid phase remaining to decrease below that in the normal eutectic mixture obtained by equilibrium cooling without the crystallization of the eutectic. Thus more complete separation of the crystallized isomer from the other isomer is obtained, as compared with equilibrium crystallization, and the disadvantages of adding a diluent are avoided.

In the drawings:

Figure 2 is a diagrammatic flow sheet of a process for the separation of the isomers of meta- and para-xylene according to an embodiment of this invention.

Figure 1:
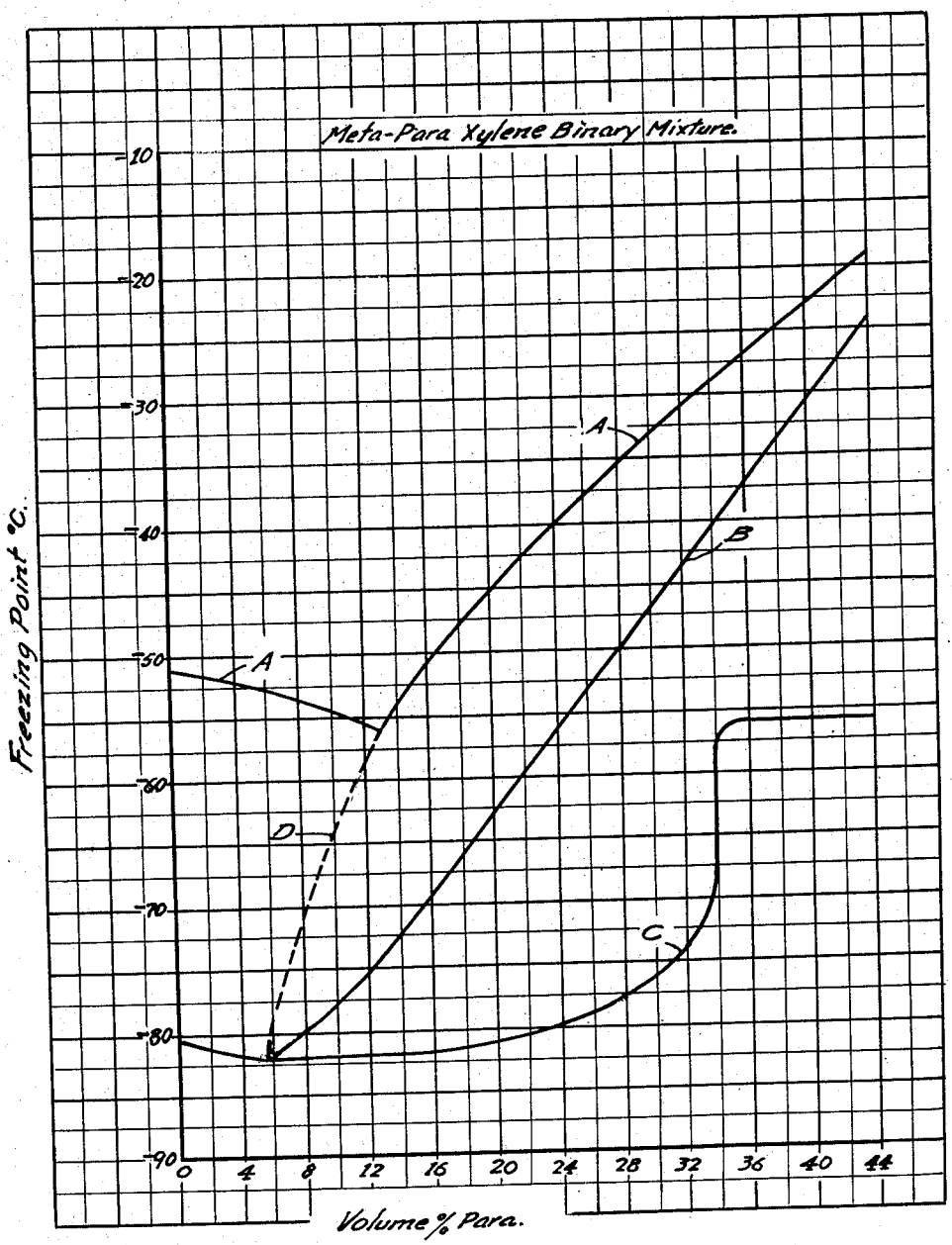
Figure 1 is the phase diagram of the meta- para-xylene system for mixtures containing from 0 to 44 percent para-xylene.

In order to illustrate the application of this invention to specific binary mixtures of isomers of an organic compound, the separation of meta- and para-xylene mixtures according to this invention will be described. Ortho-, meta-, and para-xylenes are generally obtained as a byproduct from the coking of coal or by the reforming of petroleum hydrocarbons. Ordinarily, the isomers obtained from those sources will be present in substantially equilibrium proportions, which are roughly 2 parts of ortho-, 2 parts of para-, and 5 parts of meta-xylene. The ortho-xylene may be separated from the other isomers as a bottoms product in a fractional distillation to leave a mixture of meta- and para-xylene isomers generally containing a major proportion of meta-xylene. If the binary mixture of meta- and para-xylene contains between 5.7 and 35 percent of para-xylene, the mixture is supercooled to a temperature below the eutectic freezing point of —56° C., and not lower than about —82° C., to form crystals of para-xylene. The lowest temperature of supercooling is indicated by curve C in Figure 1, and will be determined by the composition of the charge mixture.

Referring to Figure 1 of the drawings, in which the phase diagram for the meta- and para-xylene system is illustrated, the curve A represents the equilibrium freezing point of liquid of the composition indicated along the abscissa of the diagram. Curve B represents the temperature at which crystals of para-xylene will form spontaneously in liquid mixtures of the composition indicated. Curve C represents the temperature at which the entire charge mixture of the composition indicated crystallizes spontaneously. It has been discovered that the supercooled crystallization will permit the composition of the liquid phase to pass through the eutectic mixture to compositions lower in para-xylene than the eutectic mixture as the crystals of para-xylene are formed, without the formation of crystals of the eutectic mixture. Curve D of Figure 1 represents the composition of the liquid phase at supercooled crystallization temperatures below the freezing point of the eutectic.

When a mixture of meta- and para-xylene containing between 5.7 and 35 percent para-xylene is cooled under conditions to obtain supercooling, the mixture remains liquid until the temperature falls to curve B, whereupon substantially pure crystals of para-xylene are formed. Upon further supercooling crystals of para-xylene continue to be formed and upon supercooling to temperatures below the eutectic freezing point the composition of the liquid phase follows the curve D below the normal concentration of para-xylene in the eutectic mixture. The supercooling may continue to a temperature slightly above curve C at which temperature there will still be present a liquid phase which may be readily separated from the crystals of para-xylene.

It will be noted that the composition of the liquid phase resulting from supercooling and crystallizing at approximately −82° C. is about 5.7 percent para-xylene and 94.3 percent meta-xylene. Since the eutectic mixture contains approximately 13 percent para-xylene, the supercooled crystallization of this invention permits much more complete stripping of para-xylene from the charge stock than equilibrium crystallization techniques.

As mentioned above, curve C represents the temperature at which the entire mixture of para- and meta-xylene spontaneously crystallizes from charge mixtures of the indicated compositions. Hence, the maximum supercooling will be such that the temperature remains above curve C of Figure 1. It will be noted that whenever the charge composition is greater than approximately 35 percent para-xylene, crystallization of para-xylene at temperatures below the eutectic freezing point without crystallization of the eutectic mixture is not possible since the eutectic mixture spontaneously crystallizes from those solutions at substantially the freezing point of the eutectic.

Following the supercooling of the xylene mixture, the para-crystals are separated by any conventional process for the separation of liquids and solids. Satisfactory separation can be obtained by means of filters or centrifuges. The system is not sensitive to the type of separation equipment employed. The high melting point of para-xylene (13° C.) which is the solid phase, as compared with the melting point of the eutectic mixture (−56° C.), facilitates handling of the mixture during the separation.

The isomers of xylene crystallize rather slowly and supercooling may be obtained without difficulty. For example, in a batch crystallizing operation a charge mixture of meta- and para-xylene containing between 5.7 and 35 percent para-xylene is cooled in a jacketed crystallizer equipped with an agitator. The cooling may be obtained by passing acetone cooled with Dry Ice through the jacket. Other refrigerants, such as ethylene and liquid nitrogen, suitable for use at the low temperatures encountered may be employed. The rate of cooling is not critical in supercooling the mixture. A cooling rate of 2½° C. per minute has been used in batch crystallizing operations, but either a higher or lower cooling rate may be employed. It is desirable to maintain agitation during the crystallization and to avoid the presence of water or other impurities such as dust or any foreign substance which might tend to seed the mixture. However, the characteristics of the meta- and para-xylene system are such that supercooling may be obtained without difficulty.

The process has been described above in connection with a batch operation, but it is not so limited. The crystallization of the para-xylene by supercooling can be performed in a continuous crystallizer, for example, of the double pipe type, and the crystals of para-xylene separated from the mother liquor in a continuous centrifuge. Similarly, a continuous filter could be employed for the separation of the crystals of para-xylene from the mother liquor, or operation could be switched from one filter press to another to maintain a continuous flow of the mixture of para-xylene crystals and mother liquor.

To illustrate the increased recovery of para-xylene made possible by this invention, samples containing 24 percent para-xylene and 76 percent meta-xylene were cooled to the temperature indicated under the column headed by the notation "Crystallization Temperature, ° C." in the following "Table I" and held at that temperature until crystallization was substantially complete. Once the crystallization starts, it proceeds rapidly and appears to be practically complete in a period of the order of five minutes. However, in order to make sure that crystallization had substantially stopped, the mixture was maintained at the crystallization temperature for a period of one to two hours. The crystals of para-xylene were then separated from the mother liquor and the yields of para-xylene and the purity of the product determined. The procedure was repeated at successively lower crystallization temperatures as shown in Table I.

TABLE I

*First para-xylene crystallization, by super-cooling*

[Charge composition: 24% para-xylene; 76% meta-xylene.]

| Series | Crystallization Temperature, °C. | Para Crystals | | | Filtrate Composition, Percent Para |
|---|---|---|---|---|---|
| | | Percent Recovered, Based on Para in— | | Purity, Percent Para | |
| | | Eutectic | Charge | | |
| A | −50 | 70 | 37 | 96.0 | 16.3 |
| B | −55 | 99 | 52 | 95.3 | 13.5 |
| C | −60 | 112 | 59 | 93.9 | 11.3 |
| D | −65 | 122 | 64 | 97.1 | 9.7 |
| E | −67.5 | 131 | 69 | 94.3 | 8.9 |
| F | −70 | 139 | 73 | 96.7 | 8.1 |
| G | −72 | 140 | 74 | 94.8 | 7.6 |

It will be noted in Table I that series B was crystallized at substantially the freezing point of the eutectic mixture, and that the yield of paraxylene crystals, based on the eutectic composition, was 99 percent. On the other hand, if the mixture of meta- and para-xylene is supercooled to −70° C. according to this invention, the yield of para-xylene crystals increases to 139 percent, based on the eutectic composition, and increases from 52 to 73 percent based on the total para-xylene in the charge stock.

The mother liquor separated from the paraxylene crystals may be discharged from the system. However, if meta-xylene is desired, substantial recoveries of meta-xylene can be made by heating the mother liquor separated from the para-xylene crystals formed in the supercooled crystallization and then crystallizing the meta-xylene in a substantially equilibrium crystallization. The filtrate from the supercooled crystallizations set forth in Table I was heated to a temperature above the freezing point of the eutectic, seeded with crystals of meta-xylene, and cooled to a temperature slightly above the eutectic freezing point in order to maintain a liquid phase which may be separated from the crystals of meta-xylene. In this operation, the composition of the liquid phase moves to the right in Figure 1 along curve A toward the eutectic composition. The results of the seeded equilibrium cooling are shown in Table II.

TABLE II

*First meta crystallization seeded equilibrium cooling*

[Charge: Filtrates from Table I.]

| Series | Crystallization Temperature, °C. | Meta Crystals | | Filtrate Composition, Percent Para |
|---|---|---|---|---|
| | | Percent Recovered, Based on Meta in Charge to Equilibrium Cooling | Purity, Percent Meta | |
| A | −54 | 0 | [1] 90 | 12 |
| B | −55 | 0 | -------- | 13 |
| C | −55 | 31 | 92 | 13 |
| D | −55 | 32 | 98 | 13 |
| E | −53 | 33 | 99 | 13 |
| F | −55 | 37 | 97 | 12 |
| G | −54 | 38 | 99 | 10 |

[1] Para recovered.

When the charge stock contains more than about 35 percent para-xylene, and the formation of increased amounts of para-xylene crystals directly by a supercooled crystallization is not feasible because of the spontaneous formation of crystals of the eutectic composition, a combination of an equilibrium composition followed by a supercooled crystallization may be employed. A diagrammatic flow sheet of a process particularly suitable for charge stocks containing more than 35 percent para-xylene is illustrated in Figure 2.

The charge stock containing more than about 35 percent para-xylene is introduced into a crystallizer 1 which is maintained at a temperature above the freezing point of the eutectic mixture of meta- and para-xylene. Crystallizer 1 has been designated as an equilibrium crystallizer to distinguish from the supercooled crystallizer employed later in the process. Para-xylene crystals are formed in crystallizer 1 and the composition of the liquid phase in the crystallizer 1 is thereby altered and moves along the equilibrium curve A in Figure 1 of the drawings toward the eutectic composition. It is only necessary to crystallize sufficient para-xylene in crystallizer 1 to form a liquid phase having less than 35 percent para-xylene, but it is preferred to continue the equilibrium crystallization to a temperature slightly above the freezing point of the meta- para-eutectic. In this manner a maximum quantity of para-xylene crystals may be separated from the liquid in the first crystallization step. Then, in subsequent operations, the proportion of liquid phase in the system is increased to form a more fluid, easily handled, slurry. In fact, it is often desirable to employ an equilibrium crystallization followed by a separation of crystals and mother liquor and then a supercooled crystallization even when the charge stock contains less than 35 percent para-xylene in order to have a more fluid system during the supercooled crystallization.

The slurry of para-xylene crystals and mother liquor is delivered from crystallizer 1 to a separator 2 in which the para-xylene crystals are separated from the mother liquor and discharged from the system The mother liquor discharged from separator 2 contains more than 13 percent and less than 35 percent para-xylene, preferably only enough more than 13 percent para-xylene to safely avoid the formation of crystals of the eutectic mixture.

The mother liquor is delivered from separator 2 into a supercooled crystallizer 3 in which it is cooled to a temperature below the freezing point of the meta- para-eutectic. The operation of crystallizer 3 is similar to that described above for the treatment of mixtures of meta- and para-xylene containing between 13 and 35 percent para-xylene. Crystals of para-xylene are formed in crystallizer 3 and the composition of the liquid phase in contact with the crystals moves downward along curve D in Figure 1 substantially to the point at which the curve crosses the line indicating the temperature employed in crystallizer 3. The mixture of para-xylene crystals, and the resulting mother liquor containing between about 5.7 and 13 percent para-xylene, depending upon the temperature employed in crystallizer 3, is discharged into a separator 4 from which para-xylene crystals are discharged from the system.

In some instances it will not be economically desirable to separate the meta-xylene in the mother liquor in separator 4 from the para-xylene with which it is associated and the liquid phase is discarded from the system, for example, into a suitable hyrocarbon stream. The flow sheet of Figure 2, however, illustrates a process in which the mother liquor from the separator 4 is delivered to a heater 5 in which the mixture of meta- and para-xylene is heated to a temperature above the freezing point of the eutectic mixture of the xylenes. The liquid mixture of meta- and para-xylenes is then delivered to an equilibrium crystallizer 6 in which the liquid is cooled to slightly above the eutectic freezing point of −56° C. and crystals of meta-xylene are added to the mixture to initiate the formation of meta-xylene crystals. Cooling is continued until the temperature is slightly above the freezing point of the eutectic, whereupon the mixture of meta-xylene crystals and liquid phase of approximately the eutectic composition is delivered to a separator 7. The crystals of meta-xylene are separated from the mother liquor in separator 7 and discharged from the system. The mother liquor may be discharged from the system through line 8 or recycled through line 9 to the supercooled crystallizer 3 for further separation of the isomers.

Referring to Figure 1 it will be noted that if a binary mixture of meta- and para-xylene contains between about 5.7 and 13 percent para-xylene either meta-xylene or para-xylene crystals may be formed, depending upon the type of crystallization employed. For example, if a mixture containing between about 5.7 and 13 percent para-xylene is supercooled below the freezing point of the eutectic, crystals of para-xylene will be formed. On the other hand, if the mixture containing between about 5.7 and 13 percent para-xylene is cooled to a temperature slightly above the eutectic freezing point, and the crystallization initiated by seeding with crystals of meta-xylene, for example, meta-xylene crystals will be formed. Table III shows the effect of the crystallization temperature on a mixture containing 89 percent meta-xylene and 11 percent para-xylene.

TABLE III

| Charge | | Crystallization Temperature, °C. | Crystals | | | Filtrate | |
| --- | --- | --- | --- | --- | --- | --- | --- |
| Percent Meta | Percent Para | | Percent Meta | Percent Para | Yield, Percent | Percent Meta | Percent Para |
| 89 | 11 | −76.5 | 5 | 95 | ¹ 29 | 92 | 8 |
| 89 | 11 | −55 | 98 | 2 | ² 20 | 87 | 13 |

¹ Of Para, based on para in charge.
² Of meta, based on meta in charge.

The supercooling technique can be employed for the separation of isomers of organic compounds other than xylene. Many organic compounds have slow crystallization rates which encourage supercooling. Examples of other isomeric mixtures susceptible to separation by supercooling to crystallize fractionally one isomer while moving the composition of the liquid phase through the eutectic composition without the formation of crystals of the eutectic are binary mixtures of isomers of diethylbenzene, dichlorobenzene, dibromobenzene, hydroxybenzaldehyde, ethyl toluene, and cymene. Generally, the para-isomer has the fastest rate of crystallization and is crystallized from the supercooled mixture of isomers. Some isomeric compounds form solid compounds. For example, meta- and para-cresol form a solid compound of two parts of meta and one part of para. At concentrations between 12 and 60 percent para two eutectic mixtures of meta- and para-cresol exist. Even in this complicated system, the composition of the liquid may be made to pass through the eutectic composition without formation of crystals of the eutectic mixture by the supercooling technique.

We claim:
1. A process for the recovery of para-xylene from a liquid binary mixture of meta- and para-xylene containing approximately 5.7 to 35 percent para-xylene comprising supercooling the liquid binary mixture in the substantial absence of other compounds to a temperature lower than −56° C. and higher than −82° C. to form crystals of para-xylene and a mother liquor containing less than 13 percent para-xylene, and separating the crystals of para-xylene from the mother liquor.

2. A process for the separation of para-xylene from a binary mixture of meta- and para-xylene containing more than 13 percent para-xylene comprising crystallizing para-xylene from the binary mixture in the substantial absence of other compounds at a temperature above about −56° C. and below about −28° C. to form a mother liquor containing between 13 and 35 percent para-xylene, separating the crystals of para-xylene from the mother liquor, supercooling the mother liquor to a temperature below the freezing point of the meta- and para-xylene eutectic mixture and above −82° C. to crystallize para-xylene therefrom, and form a mother liquor containing less than 13 percent para-xylene and separating the para-xylene crystals from the mother liquor.

3. A process for the separation of para-xylene from a binary mixture of meta- and para-xylene containing more than 13 percent para-xylene comprising crystallizing para-xylene from the mixture in the substantial absence of other compounds at a temperature slightly above −56° C. to form a mother liquor containing slightly more than 13 percent para-xylene, separating the crystals of para-xylene from the mother liquor, supercooling the mother liquor to a temperature below −56° C. and above −82° C. to crystallize para-xylene from a remaining mother liquor containing less than 13 percent para-xylene, and separating the para-xylene crystals from the remaining mother liquor.

4. A process for the separation of meta- and para-xylene from a binary mixture of the isomers comprising supercooling a liquid mixture of meta- and para-xylene containing between about 5.7 percent and 35 percent para-xylene in the substantial absence of compounds other than meta- and para-xylene to a temperature below −56° C. and above about −82° C. to form crystals of substantially pure para-xylene in a first mother liquor containing less than 13 percent para-xylene, separating the first mother liquor from the crystals of para-xylene, heating the first mother liquor to a temperature above −56° C., cooling the first mother liquor at a temperature slightly above −56° C. and seeding the first mother liquor with meta-xylene crystals to crystallize meta-xylene under substantially equilibrium conditions and form a second mother liquor, and separating the thus formed crystals of meta-xylene from the second mother liquor.

5. A process for the separation of meta- and para-xylene from a binary mixture of the isomers comprising supercooling a liquid mixture of meta- and para-xylene containing between approximately 5.7 percent and 35 percent para-xylene in the substantial absence of compounds other than meta- and para-xylene to a temperature below −56° C. and above about −82° C. to form crystals of para-xylene and a first mother liquor containing less than 13 percent para-xylene, separating the first mother liquor from the crystals of para-xylene, heating the first mother liquor to a temperature above −56° C., cooling the first mother liquor at a temperature slightly above −56° C. and seeding the first mother liquor with meta-xylene crystals to crystallize meta-xylene under substantially equilibrium conditions and form a second mother liquor, separating the thus formed crystals of meta-xylene from the remaining mother liquor, and recycling the mother liquor from the meta-crystallization to the supercooled crystallization of para-xylene crystals.

6. A process for the separation of meta- and para-xylene from a binary mixture of the two isomers containing more than approximately 13 percent para-xylene comprising crystallizing para-xylene from the mixture in the substantial absence of other compounds at a temperature above −56° C. to form a remaining liquid phase containing between 13 and 35 percent para-xylene, separating the para-xylene crystals from the remaining liquid phase, supercooling said remaining liquid phase at a temperature below −56° C. and above about −82° C. to crystallize para-xylene and form a meta-rich mother liquor containing less than 13 percent para-xylene, separating the para-xylene crystals from the meta-rich mother liquor, heating the meta-rich mother liquor to a temperature above −56° C., cooling the meta-rich mother liquor at a temperature slightly above −56° C. to form crystals of meta-xylene in a third mother liquor, and separating the crystals of meta-xylene from the third mother liquor.

7. A process for the separation of binary mixtures of isomers of substituted benzene compounds selected from the group consisting of xylene, diethylbenzene, dichlorobenzene, dibromobenzene, hydroxybenzaldehyde, ethyl toluene, cymene and cresol, which form an eutectic mixture of isomers on equilibrium crystallization comprising supercooling a liquid binary mixture of the isomers in the substantial absence of other compounds to a temperature below the freezing point of the eutectic mixture but above the temperature at which the entire binary mixture crystallizes, crystallizing one of the isomers from the liquid at the temperature of supercooling to reduce the concentration of that isomer in the remaining liquid phase below the concentration in the eutectic mixture and separating the crystals of the isomer from the remaining liquid phase.

8. A process for the recovery of para-xylene from a liquid binary mixture consisting essentially of meta- and para-xylene in which the concentration of para-xylene is in the range of 13 to 35 percent comprising super-cooling the mixture to a temperature below the eutectic freezing point of −56° C. of mixtures of meta- and para-xylene and above −82° C. to form substantially pure crystals of para-xylene and a mother liquor having a para-xylene concentration lower than the para-xylene concentration in the eutectic mixture, and separating the crystals of para-xylene from the mother liquor.

References Cited in the file of this patent

UNITED STATES PATENTS

| 1,940,065 | Spannagel et al. | Dec. 19, 1933 |
| 2,398,526 | Greenburg | Apr. 16, 1946 |
| 2,530,978 | Mason | Nov. 21, 1950 |
| 2,622,115 | Carney | Dec. 16, 1952 |
| 2,777,888 | Hoff et al. | Jan. 15, 1957 |

FOREIGN PATENTS

| 687,405 | Great Britain | Feb. 11, 1953 |

OTHER REFERENCES

Daniels: Outlines of Physical Chemistry, page 308 (1948), John Wiley and Sons, Inc., New York.